United States Patent [19]

Hayakawa

[11] E Re. 29,832

[45] Reissued Nov. 14, 1978

[54] PRINTING MECHANISM

[75] Inventor: Toshio Hayakawa, Kadoma, Japan

[73] Assignee: Matsushita Electric Industrial Co., Ltd., Japan

[21] Appl. No.: 810,440

[22] Filed: Jun. 27, 1977

Related U.S. Patent Documents

Reissue of:

[64] Patent No.: 3,929,215
Issued: Dec. 30, 1975
Appl. No.: 513,068
Filed: Oct. 8, 1974

[30] Foreign Application Priority Data

| | | | |
|---|---|---|---|
| Oct. 12, 1973 | [JP] | Japan | 48-115241 |
| Oct. 12, 1973 | [JP] | Japan | 48-115242 |
| Oct. 12, 1973 | [JP] | Japan | 48-115243 |
| Oct. 12, 1973 | [JP] | Japan | 48-119322[U] |
| Oct. 12, 1973 | [JP] | Japan | 48-119323[U] |
| Oct. 12, 1973 | [JP] | Japan | 48-119324[U] |
| Oct. 12, 1973 | [JP] | Japan | 48-119325[U] |
| Oct. 12, 1973 | [JP] | Japan | 48-119326[U] |
| Aug. 20, 1974 | [JP] | Japan | 49-99926[U] |
| Aug. 20, 1974 | [JP] | Japan | 49-99927[U] |

[51] Int. Cl.[2] ..... B41J 3/04
[52] U.S. Cl. ..... 400/320.1; 400/328
[58] Field of Search ..... 197/1 R, 16, 18, 55, 197/82, 84 R, 84 B, 49, 90, 89, 114 R, 120; 346/76 R; 101/93.16, 93.05; 74/30

[56] References Cited

U.S. PATENT DOCUMENTS

| | | | |
|---|---|---|---|
| 472,539 | 4/1892 | Hill | 74/30 |
| 3,331,316 | 7/1967 | Bretti | 101/93.16 |
| 3,628,645 | 12/1971 | McFeaters et al. | 197/90 |
| 3,710,912 | 1/1973 | Bretti et al. | 197/49 |
| 3,789,969 | 2/1974 | Howard et al. | 197/1 R |
| 3,833,891 | 9/1974 | Howard et al. | 340/172.5 |

*Primary Examiner*—Paul T. Sewell
*Attorney, Agent, or Firm*—Robert E. Burns; Emmanuel J. Lobato; Bruce L. Adams

[57] ABSTRACT

A mangle wheel having first and second toothed portions arranged in outer and inner arcuate paths forming a continuous loop is rotatably mounted on a support which is pivotally mounted within a housing. A gear is engaged with the continuous loop of teeth to drive the mangle wheel in one direction at a low speed and in the opposite direction at a high speed. A printer head unit is slidably mounted on a guide shaft pivotally mounted on the side walls of the housing. Rotation of the mangle wheel is transmitted to longitudinal movement of the printer head unit to thereby move the same in one direction to effect scanning and in the opposite direction to quickly return the same to the original position. The printer head unit is also movable transversely between an active position in which the head unit is in contact with the plane of a sheet of recording paper and an inactive position disengaged from contact with the paper surface. The support is movable within a limit of travel as the mangle wheel changes its direction of rotation and arranged to move the printer head unit to the inactive position during its return movement.

17 Claims, 24 Drawing Figures

PRINTING MECHANISM

Matter enclosed in heavy brackets [ ] appears in the original patent but forms no part of this reissue specification; matter printed in italics indicates the additions made by reissue.

*This is a reissue of U.S. Pat. No. 3,929,215, which patent was based on applications filed on:*

*Oct. 12, 1973 Japan 48-115241*
*Oct. 12, 1973 Japan 48-115242*
*Oct. 12, 1973 Japan 48-115243*
*Oct. 12, 1973 Japan 48-119322[U]*
*Oct. 12, 1973 Japan 48-119324[U]*
*Oct. 12, 1973 Japan 48-119323[U]*
*Oct. 12, 1973 Japan 48-119325[U]*
*Oct. 12, 1973 Japan 48-119326[U]*
*Aug. 20, 1974 Japan 49-99926[U]*
*Aug. 20, 1974 Japan 49-99927[U]*

*The benefit of the priority of those applications is claimed herein.*

The present invention relates generally to printing mechanisms for use as a terminal equipment of a data processing machine, and more particularly to a scanning mechanism in which a writing unit of the nonimpact type is moved in opposite directions along a straight path in proximity with or in contact with a writing surface.

The speed of recording data on paper in a data processing machine is limited for one thing by the capability of the writing mechanism, which in many cases is substantially less than that of the data processing machine. Then, too, a substantial portion of the costs of the data processing machine can be attributable directly to the speed of the writing mechanism. Furthermore, the mechanisms for these rapid writers are heavy, operate clumsily and produce annoying noise.

One type of writing mechanism is, for example, the so-called impact printer in which hammers print symbols on paper with the aid of printing type or a type head.

A modification of this writing mechanism is the mosaic writer in which pins and striking tools are used to record a symbol on paper in the form of dots with the aid of a colored ribbon. An arrangement is also known in which electrodes act on a special heat sensitive paper. Another type of non-impact writing mechanism utilize a stream of charged liquid droplets ejected by pressure produced by electrical pulses.

One object of the invention is to provide a novel mechanism for moving such non-impact type writing unit in opposite directions along a straight path to sequentially scan across each of a plurality of line paths within a sheet of recording paper.

Another object of the invention is to provide an improved scanning mechanism which is simple in construction and compact in size.

A further object of the invention is to provide an improved printing mechanism in which the writing unit is energized by electrical pulses generated by a novel mechanism.

Still another object of the invention is to provide a novel quick return mechanism in which a mangle wheel is provided with first and second teeth arranged in an arcuate continuous path and a drive gear engaged with the teeth to rotate the wheel in one direction at a low speed and in the opposite direction at a high speed.

Briefly stated, an elongated support member is pivoted at one end on the bottom wall of a housing. A mangle wheel having inwardly facing teeth arranged in an arcuate path along its outer periphery and outwardly facing teeth arranged inwardly of and in parallel with the inwardly facing teeth forming a continuous loop is pivotally mounted at the other end of the support. A drive gear is engaged with the loop of teeth to rotate the mangle wheel in one direction at a low scanning speed and in the opposite direction at a high return speed. A writing unit of the non-impact type is slidably mounted on a guide shaft which is pivoted at the opposite ends to the side walls of the housing. A connection is provided between the mangle wheel and the writing unit to transmit the bidirectional rotation of the wheel to bidirectional linear movement of the writing unit. The elongated support is swivelled as the drive gear changes its engagement with the inwardly facing teeth to the engagement with the outwardly facing teeth to rotate the guide shaft about its axis. A sheet of recording paper is fed into a guide mechanism. As the mangle wheel is rotated at a low scanning speed, the writing unit moves along the guide shaft to scan across the paper to produce visual image in accordance with an output signal received, for example, from a data processing machine. At the end of a line scan, the mangle wheel changes its direction of rotation and moves the writing unit in the opposite direction at a high speed to the original position. A pair of switch contacts may be actuated in response to the movement of the mangle wheel to stop rotation of the drive gear which may subsequently be driven by signals provided by the data processing machine. A pulse generator may be provided which comprises a gear wheel of a magnetic material driven at a constant speed, a magnetic core, a winding mounted on the core, a permanent magnet and an L-shaped member of a magnetic material. The magnetic core has one end disposed in proximity to one of the gear teeth with a predetermined air gap and the L-shaped member has its short arm portion coupled to magnet and its long arm portion directed to another of the gear teeth so that a magnetic circuit is formed in a loop including the gear wheel, the magnetic core and the L-shaped member. As the gear wheel is rotated a train of electrical pulses is generated across the terminal leads of the winding. When the writing unit is a dot matrix type to record a symbol in the form of dots, the electrical pulses are used to drive the writing unit in timed relation with the output signal from the data processing machine.

The invention will be described in detail in the following description taken in connection with the accompanying drawings, in which.

Figure 1:
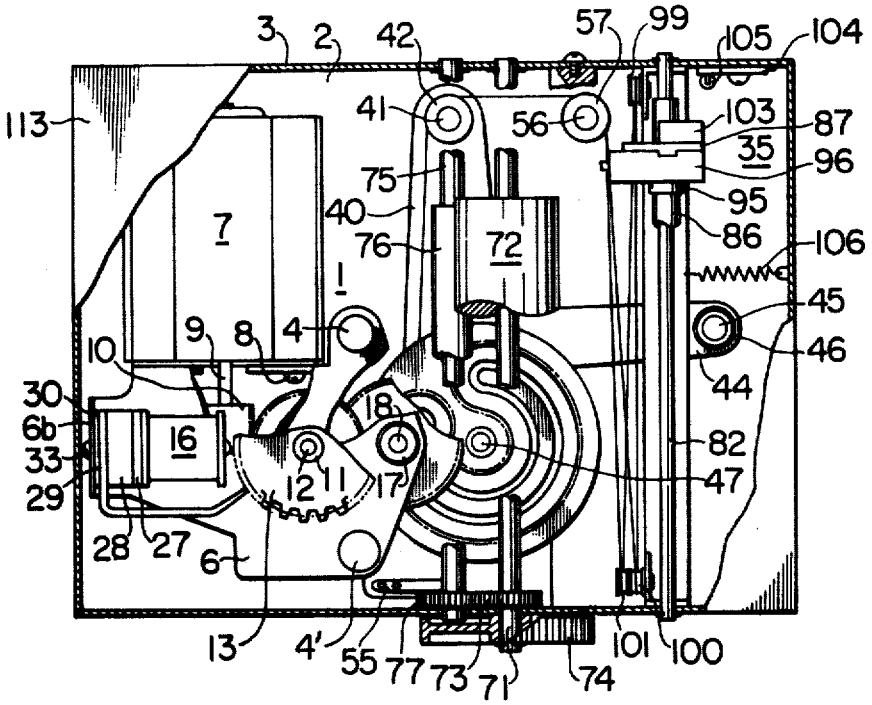
FIG. 1 is a plan view of a scanning mechanism of the invention.
Figure 2:
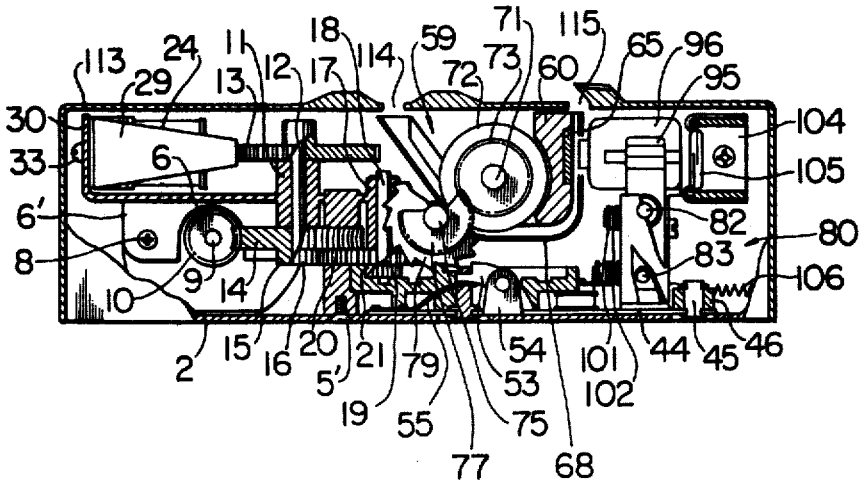
FIG. 2 is a side view of the mechanism of FIG. 1.
Figure 3:
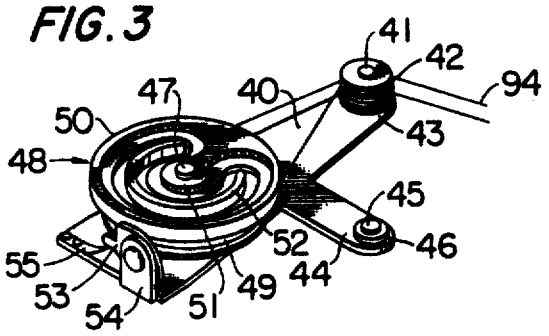
FIG. 3 is a perspective view of a mangle wheel shown mounted on a support.
Figure 4:
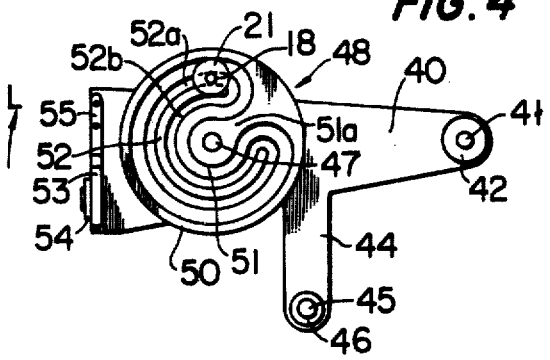
FIG. 4 is a plan view of the mangle wheel and the support of FIG. 3.
Figure 12:
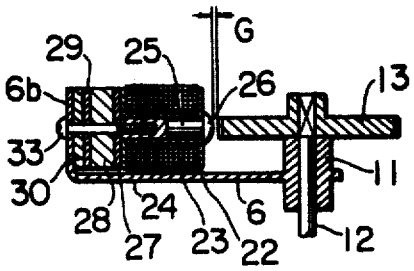
FIG. 12 is a side view of a pulse generator according to the invention.

Reference is now made to FIGS. 1 and 2, a scanning mechanism of the present invention is shown and comprises a housing 1 having a bottom wall 2 and a pair of opposing side walls 3 and 3', a support member 6 mounted on posts 4 and 4', and an electric motor 7 fixed to a side plate of the support member 6 by screws 8. A spur gear 10 is mounted on the rotating shaft 9 of the motor 7. A gear 13 formed of a magnetic material is mounted on the upper end of a shaft 12 rotatably supported by a bearing 11 mounted on the support member 6. A gear 14 is mounted on the lower end portion of the shaft 12 for rotation with the magnetic gear 13 and for engagement with the gear 10 of the motor 7 and a gear 16 is integrally formed with the gear 14 to engage a gear 20 mounted on the lower end of a shaft 18 rotatably supported on a bearing 17 mounted on the support 6. A gear 21 is integrally formed with the gear 20. Rotation of the motor 7 is therefore transmitted through the gear train to the gears 14, 15 and gears 20, 21. A pulse generator 16 is mounted on the support 6 by screw 33 and comprises a magnetic core 25 mounted on a central bore 23 of a bobbin or spool 22 (see also FIG. 12) on which is mounted a winding 24. The screw 33 is threaded through the inner end of the core 25. The outer end of the core 25 is in spacedly opposed relation with one of the teeth of the gear 13, the air gap therebetween being adjustable by means of the screw 33. The pulse generator 16 further comprises a magnetic plate 27, a permanent magnet 28, an L-shaped magnetic member 29 and an elastic member 30, all of which are mounted in side-by-side relation on the screw 33 as a one-piece construction with the winding 24. The long arm portion of the L-shaped member 29 extends parallel with the longitudinal axis of the magnetic core 25 and the extreme end thereof is disposed in spacedly opposed relation with one of the teeth of the gear 13. A magnetic loop circuit is thus formed through a path including the magnet 28, core 25, an air gap across the core 25 and one of the teeth of gear 13, another air gap across the extreme end of the L-shaped member 29 and another tooth of the gear 13. Upon rotation of the gear 13, a train of electrical pulses is generated in the winding 24 as the magnetic flux density is fluctuated due to the variation of the air gaps. The electrical pulses are utilized as a timing pulse as will be described later. The elastic member 30 permits adjustment of the air gap between the core end and the gear teeth while the screw holds the components together. A swivel support 40 is rotatably mounted on a pivot 41 fixed to the bottom wall 2 (FIGS. 3 and 4). Pulleys 42 and 43 are rotatably supported on the pivot 41. A pulley 49 and a quick return mechanism or a mangle wheel 48 mounted on a pivot 47 rotatably mounted on the swivel support 40 at a distance from pivot 41. The mangle wheel 48 includes an inwardly formed or inner toothed portion 50 on the outer peripheral edge and an outwardly formed or outer toothed portion 51 on the outer wall of a peninsular 51a which extends inwardly from the outer periphery. The inner and outer toothed portions are at equal pitch and form a continuous loop of teeth to mesh with the gear 21. The mangle wheel 48 is further provided with a continuous arcuate guide groove 52.

The shaft 18 has the lower end thereof received in the guide groove 52 and the gear 21 mounted thereon is engaged with the inner or outer teeth of the mangle wheel 48. When the shaft 18 is received in the outer groove 52a, the gear 21 engages the inner toothed portion 50 as illustrated in FIG. 4. The rotation of gear 21 causes the mangle wheel 48 to rotate about the pivot 47 in a clockwise direction at a low scanning speed. When the shaft 18 comes into engagement with the inner guide groove 52b, the gear 21 engages the outer toothed portion 51 and the wheel 48 is caused to rotate in a counterclockwise direction position at a high speed. During the transitory period, the support 40 swivels about pivot 41 to permit the gear 41 to engage the outer teeth 51. Therefore, the gear 21 so driven by motor 7 in the same direction of rotation causes the mangle wheel 48 to rotate at a low speed in a clockwise direction and at a high speed in a counterclockwise direction and causes swivel movement of the support 40 during transition period. A ratchet pawl 53 is pivotally mounted on the support 40 and biased upwardly by a leaf spring 55.

Figure 6:
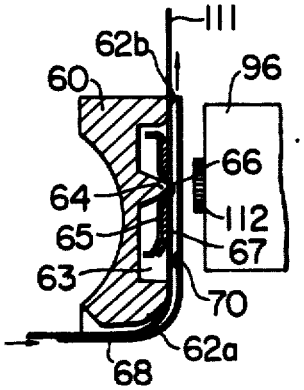
FIG. 6 is a cross-sectional view taken along line 6—6 of FIG. 5, together with a writing unit located adjacent the front face of the guide mechanism.
Figure 5:
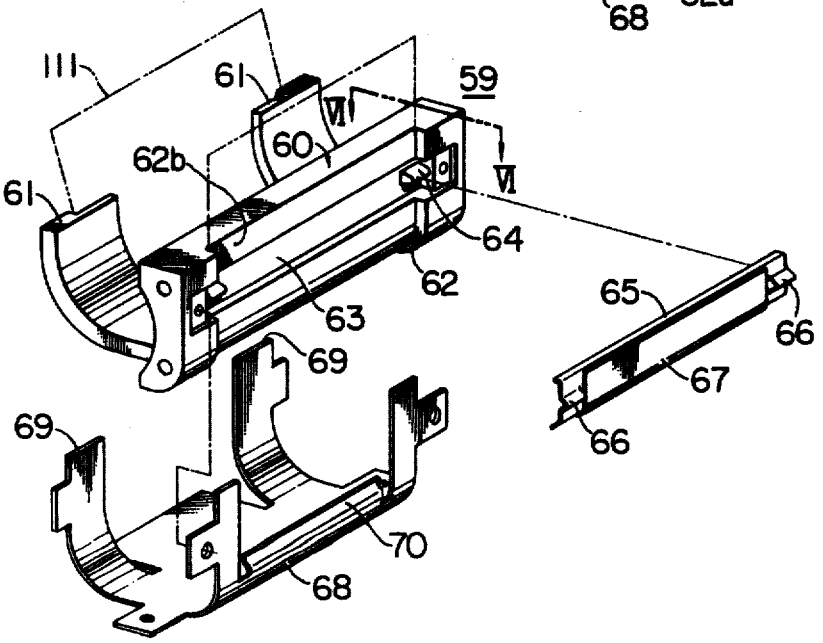
FIG. 5 is a perspective exploded view of a paper guide mechanism of the invention.

A paper guide mechanism 59 is supported underside of the top wall 113 of the housing 1. The guide mechanism 59 comprises a support frame 60 mounted at the opposite ends to the side walls 3,3', an elongated guide plate 65 pivotally mounted within the support 60 and a lower guide member 68. The support frame 60 has a pair of arcuate paper guides 61, an elongated groove 63 within which the guide plate 65 is pivotally mounted by a pair of projections 64, and lower and upper guide surfaces 62a and 62b. The guide plate 65 is provided with a pad 67 on the outer side thereof and a pair of recesses 66 to engage the projections 64 to cause the guide member 65 to swing about the pivots or projections 64 within the groove 63 (see FIGS. 5 and 6). The lower guide member 68 has a pair of guide members 69 to define a pair of arcuate guide channels with the upper guides 61 to permit the forward edge of a sheet of recording paper to be fed therethrough. A paper deflecting portion 70 is provided on the inside of lower guide member 68 at a position slightly lower than the lower edge of the guide member 65 so that the forward end of the paper is deflected toward the guide member 65 into contact with the pad 67. Pivotal movement of the guide plate 65 permits it to be brought in a full contact with the surface of image producing elements or electrodes mounted on a writing unit to be described later. The guide member 65 has its lower edge preferably inwardly flared to aid in guiding the forward edge of the paper to an upper position.

A roller 72 made of an elastic material is mounted on a shaft 71 rotatably supported on the side walls 3,3" and is in contact with the circumferential periphery of a pinch roller 76 mounted on a shaft 75 rotatably supported on the side walls 3,3'. A gear 73 is mounted on the shaft 71 to engage a gear 77 mounted on the shaft 75. One end of the shaft 71 extends through the side wall 3' to mount thereon a knob 74 to permit the user to manually transport the paper to a desired position. A ratchet wheel 79 is mounted on the shaft 75 and is engageable with the ratchet pawl 53 as the swivel support 40 is rotated about the pivot 41 as referred to above.

Figure 7:
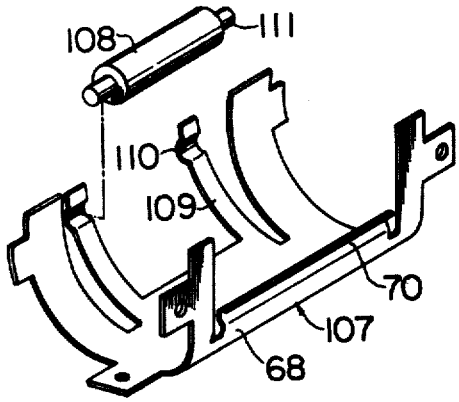
FIG. 7 is a perspective view showing an alternative arrangement of the guide mechanism of FIG. 5.

In order to provide resilient contact between the pinch roller 76 and the roller 72, the lower guide member 68 may preferably be provided with a pair of roller supports 109 each having a recess to rotatably support the shaft 75 instead of being supported on the side walls 3,3' to urge the pinch roller 76 into abutment with the circumferential periphery of the roller 72 (see FIG. 7).

Figure 8:
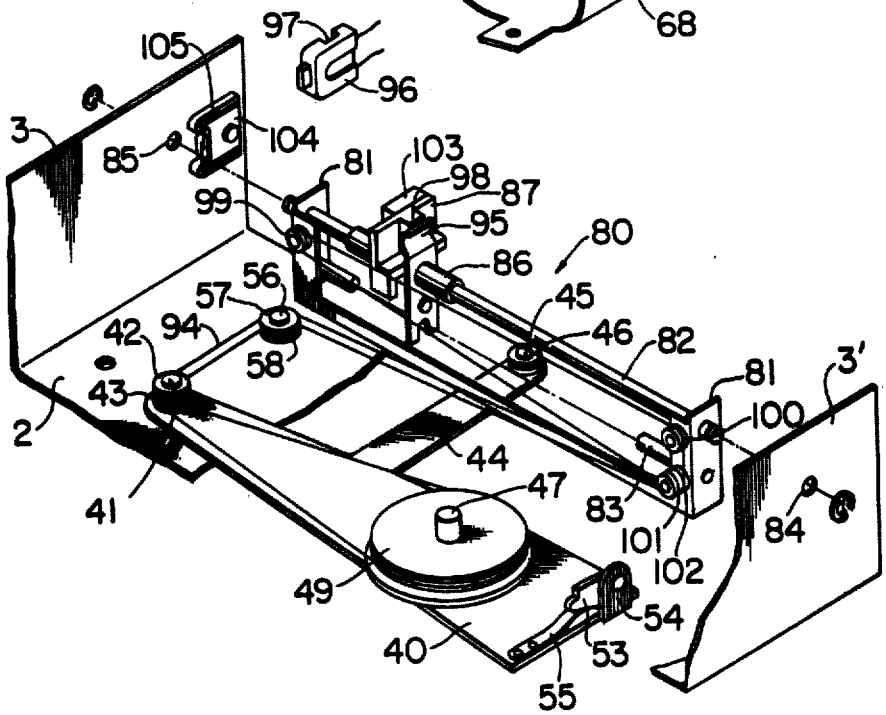
FIG. 8 is a perspective view of a guide mechanism for two directional slide movement of the writing unit showing relation with the mangle wheel and its support.
Figure 9:
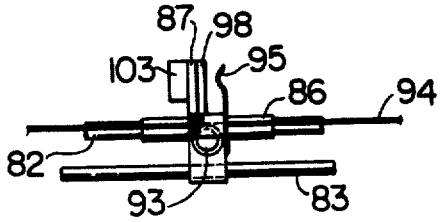
FIG. 9 is an elevational view of the writing unit.
Figure 10:
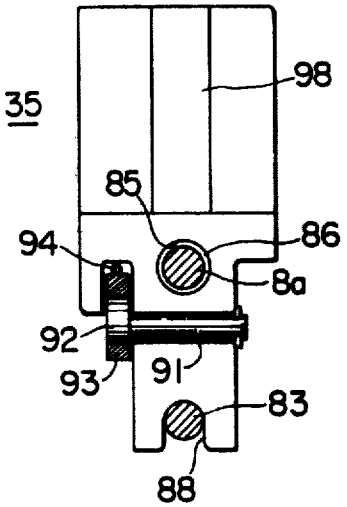
FIG. 10 is an end view of the writing unit.
Figure 11:
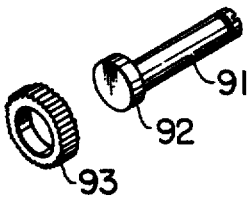
FIG. 11 is a perspective view of an eccentric cam with a knurled ring.

A writing unit guide mechanism 80 is provided which comprises a generally U-shaped support 81 and a pair of parallel guide shafts 82 and 83 fixedly supported thereby (FIG. 8). The opposite ends of the shaft 82 extend through the side walls 3 and 3' to permit the support 81 to swing about the shaft 82. The swingable support 81 has its intermediate portion resiliently connected to the housing 1. An extension arm 44 is provided on the swivel support 40. A roller 46 is rotatably mounted on a pivot 45 mounted on the extreme end of the extension arm 44 to engage the support 81. A carriage 35 is slidably supported on the shafts 82 and 83 and provided with a projection 98, a bore 85, a guide slot 88 on the underside thereof, a side slot 89, and a rotatable shaft 91 transversely received therein and may be further provided with a permanent magnet 103 (FIG. 9). A cam 92 is eccentrically secured to one end of the shaft 91 and is provided with a knurled ring 93 to provide a firm gripping of wires 94 threading through the slot 89 against the slot wall (FIG. 10). A printer head unit 96 (FIG. 1) is provided, for example, with a plurality of heat producing electrodes vertically arranged in a row, and a recess 97 to be engaged with the projection 98 of the carriage 35 and held in position by a leaf spring 95. A pipe 86 is fixed to the support 87 through the bore 85. The shaft 82 of the guide mechanism 80 extends through the pipe 86 and the shaft 83 is received in the guide slot 88.

In FIG. 8, a pulley 49 is mounted on the shaft 47 for unitary rotation with mangle wheel 48 and supports a loop of belt or wire 94 through pulleys 42 and 43 mounted on pivot 41. Pulleys 57 and 58 are rotatably mounted on pivot 56 mounted on the bottom wall 2. Pulleys 100, 101 and 102 are rotatably mounted at one end of the U-shaped support 81 and a pulley 99 is mounted at the other end of the support. The wire 54 extends from pulley 49 to pulleys 43, 58, 101, 99, slot 89 of the head mounting 35, pulleys 100, 102, 56, and returns to pulley 49. The mounting of pulleys 42 and 43 on pivot 41 about which the swivel support 40 is rotated ensures that the wire is properly tensioned regardless of the movement of the support 40 without the need to provide a tension compensating means. A reed switch 105 is mounted on an insulating support 104 attached to the side wall 3. The reed switch 105 may have its contacts placed in a circuit for de-energizing the motor 7 when the magnet 103 is brought into proximity thereto. The motor 7 may be re-started for subsequent scanning under the control of a signal delivered from a data processing machine to which the present invention to related. The carriage 35 is fixed to the wire 94 which extends between pulleys 99 and 100 so that bidirectional rotation of mangle wheel 48 permits the writing unit 96 to move along the guide shafts 82 and 83.

In operation, the user inserts a sheet of heat-sensitive paper 111 through a slot 114 of top wall 113 into paper guide mechanism 59 and rotates the knob 74 counterclockwise to feed the paper over the guide surfaces 62a and 62b until the forward edge of the paper slightly extends out of outlet 115. The motor 7 is energized to cause rotation of the gear train comprising gears 14, 15, 20 and 21 at a constant speed. The rotation of gear 21 causes the mangle wheel 48 to rotate in opposite directions at different speeds as previously described. When the mangle wheel 48 is rotated in a clockwise direction at a low speed as the gear 21 engages the inner teeth 50, the writing unit 96 is moved from a starting position in which the magnet 103 is in proximity to the reed switch 105 to the opposite end of the guide shaft 82. While the writing unit 96 is moved at a low speed, electrodes 112 mounted on the writing unit 96 are in contact with the frontal plane of the recording paper 111 by spring 106 to record digital information thereon in a conventional manner. As the writing unit 96 approaches the opposite end of the guide shaft 82, gear 21 starts to disengage from the inner teeth 50 and to come into engagement with the outer teeth 51 to rotate the mangle wheel 48 in a counterclockwise direction at a high speed so that the printer head unit 96 is quickly returned to the starting position. During the transsitional period, the swivel support 40 is rotated about pivot 41 in a direction indicated by arrow L in FIG. 4 so that shaft 18 is transferred from engagement with the other guide groove 52a to engagement with the inner guide groove 52b. Upon swivel movement of the mangle wheel 48, the roller 46 is urged into contact with the U-shaped guide 80 to rotate shaft 83 about shaft 82 toward mangle wheel 48, so that writing unit 96 is moved away from engagement with the plane of the recording paper 111. Also, the swivel movement of the support 40 causes ratchet pawl 53 to engage ratchet wheel 79 to drive it a step further so that the pinch roller 76 is rotated to shift the recording paper 111 by engagement between the pinch roller 76 and roller 72 by the width of a line scan. With the writing unit 96 being disengaged from contact with the surface of the recording paper 111, the carriage 35 is quickly returned to the starting position for subsequent line scanning.

A train of pulses generated by the timing pulse generator 16 may be supplied to the electrodes 112 through an AND gate (not shown) to which an output is applied from the data processing system to record a symbol in the form of dots.

Figure 13:
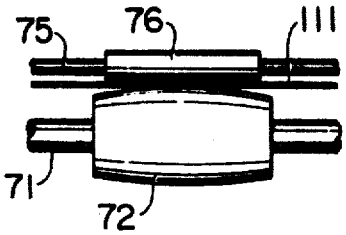
FIG. 13 is a view showing an alternative arrangement of rollers arranged to guide and shift the recording paper.

In order to feed the recording paper in a straight line path exactly normal to the direction of line scan, the roller 72 may be rounded as illustrated in FIG. 13 so that the paper 111 is substantially in point contact with the paper surface. If the roller 72 has a cylindrical surface, any slight difference in diameter between the opposite ends of the roller 72 will cause the paper to be moved in different speeds at the opposite edges.

Figure 14A:
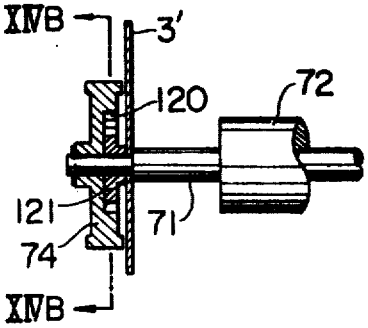
FIG. 14A is a cross-sectional view of a manual knob for driving the paper guide roller with a one-way clutch mechanism.
Figure 14B:
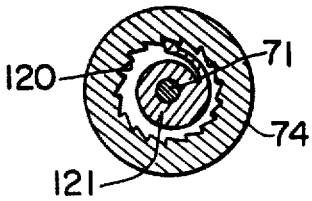
FIG. 14B is a cross-sectional view taken along line A—A of FIG. 14A.
Figure 15A:
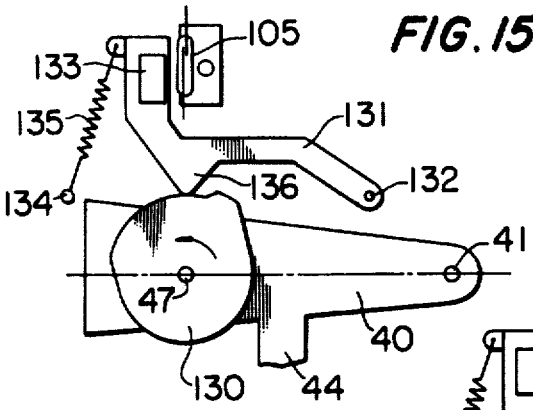
FIGS. 15A to 15H are sequential views of a cam and cam follower arrangement arranged to operate a reed switch with rotation of the mangle wheel and FIG. 16 is a schematic view showing various positions of the writing unit in correspondence with the rotation of the cam of FIG. 15.
Figure 15B:
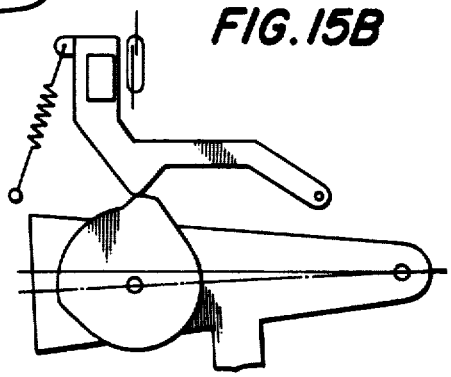
Figure 15C:
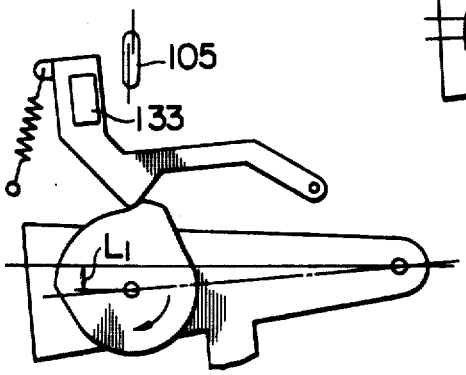
Figure 15D:
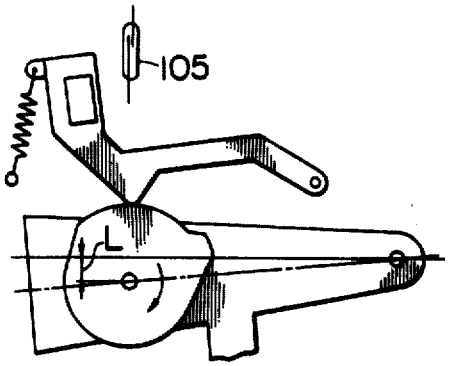
Figure 15E:
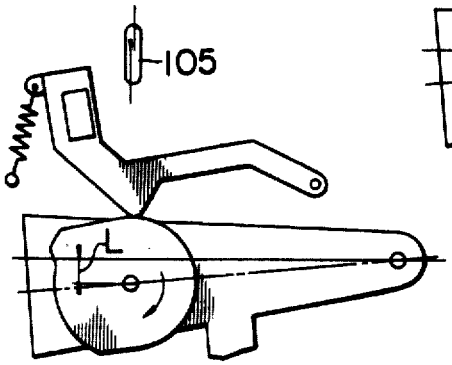
Figure 15F:
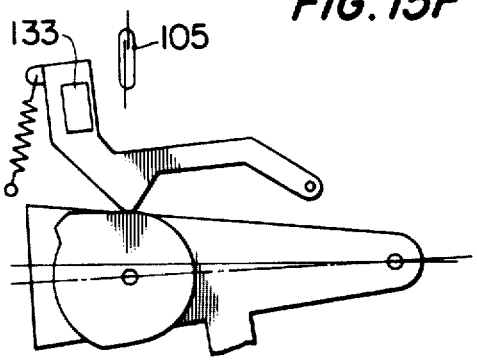
Figure 15G:
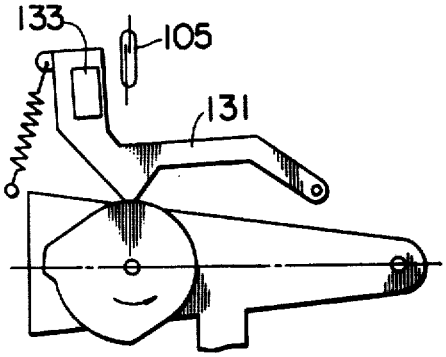
Figure 15H:
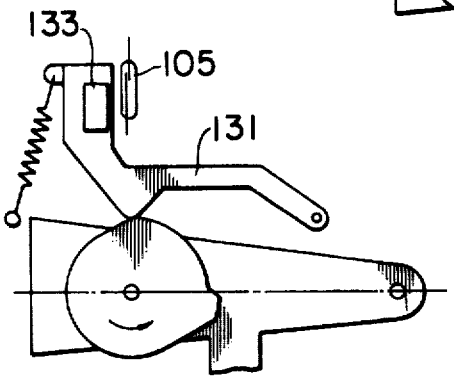

In order for the knob 74 to be manually rotated counterclockwise to feed the recording paper to a position in which line scanning proceeds whether the ratchet pawl 53 is in engagement with the ratchet wheel 79 or not, but to prevent the knob 74 from being manually rotated clockwise when the ratchet pawl is engaged with the ratchet wheel 79 so that damage may not occur to the ratchet wheel 79, the knob 74 may preferably be provided with a one-way clutch mechanism as illustrated in FIGS. 14A and 14B. The knob 74 may be provided with inner ratchet teeth 124 on the inner side thereof and a ratchet pawl 121 is mounted on the shaft 71. The rotation of knob 74 in a clockwise direction permits the pawl 121 to engage the ratchet teeth 120 to rotate the shaft 71 therewith and the counterclockwise rotation of the knob prevents the pawl to engage the teeth thereby preventing the unitary rotation of knob 74 and shaft 71 in a counterclockwise direction.

Figure 16:
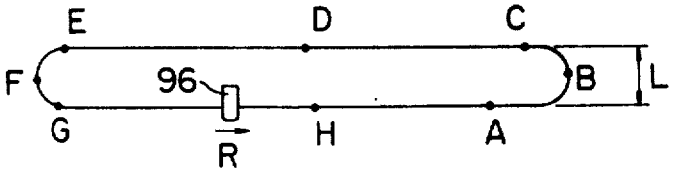

In order to effect switching of the reed switch 105, an alternative arrangement is shown in FIG. 15. A cam 130 is mounted on the shaft 47 for unitary rotation with the mangle wheel 48, a cam follower 131 is pivotally mounted on a pivot 132 mounted on the bottom wall 2 and urged into abutment contact with cam 130 by spring 135 supported between the cam follower 131 and a post 134 mounted on the bottom wall 2. A permanent magnet 133 is mounted on one end of the cam follower 131. The reed switch 105 is disposed in proximity to the magnet 133 to be operated thereby. The cam 130 is rotated in unison with the mangle wheel 48 in opposite directions at different speeds at previously described. In FIG. 16, the writing unit 96 is shown driven at a high speed to return to the starting position and as it approaches point A the cam 130 is in abutment with a lug 136 of the cam follower 131 and driven in a counterclockwise direction at a high speed. As point B is reached in FIG. 16, the swivel support 40 is started to rotate about pivot 41 as shown in FIG. 15B with the cam 130 being substantially stopped rotation. At this moment the quick return movement is completed and the mangle wheel 48 changes its direction of rotation. The swivel support 40 reaches its limit of travel of movement as indicated by arrow L in FIG. 15C in which the printing head unit 96 reaches point C as shown in FIG. 16 and magnet 133 is started to move away from reed switch 105 to de-activate the same. The mangle wheel 48 is rotated at a low speed to effect scanning and as point D is reached cam 130 is as shown in FIG. 15D. This condition continues until point F is reached at which the swivel support 40 is started to return to the original position and cam 130 is substantially stopped rotation. As point G is reached, support 40 is returned to the original position and cam 130 is started to rotate in a counterclockwise rotation at a high speed for quick return to starting position. As point H is reached, magnet 133 is again brought into proximity to the reed switch 105 to operate the switch contacts.

One of the advantages of the present invention is that a mangle wheel rotatably supported on a swivel support permits the writing unit to move in a straight longitudinal path at a low speed, to return at a high speed and to move in a direction transverse to the longitudinal path so as to disengage from contact with the paper surface during its return movement and also permits the paper shift mechanism to proceed the paper to a step further while the writing unit is returned to the original position. This results in compactness in overall size. A further advantage is that the writing unit being returned to the original position free from contact with the paper surface, the writing electrodes or writing elements are ensured to have long usable life. The use of wire as a means for transmitting movement of components permits them to be arranged in a small area.

What is claimed is:

1. A mechanism [for moving a writing unit of a nonimpact type along a straight path to scan across each of a plurality of line paths within a sheet of recording paper, comprising, a housing having a bottom wall and a pair of opposing side walls, a support rotatably mounted on said bottom wall, a mangle wheel rotatably mounted on said support and having first and second toothed portions arranged in an outer and an inner arcuate path to form a continuous loop, a gear engaged with said loop of teeth, drive means for driving said gear whereby said mangle wheel is rotated in one direction at a first speed and in the opposite direction at a second speed higher than said first speed, first guide means arranged to guide said writing unit along said straight path, means for connecting said writing unit with said mangle wheel to cause said writing unit to move in opposite directions, second] *according to claim 16, including additional* guide means for guiding said recording paper [, and] *in a direction normal to said straight path; and shifting* means engageable with said support for [stepwisely] shifting said paper [in a direction normal to the direction of movement of said writing unit,] *stepwise along said second guide means* when said writing unit moves at said second speed.

2. The mechanism of claim [1] *16*, wherein said [first] *writing unit* guide means is movable transverse to the direction of movement of said writing unit between an active position in which said writing unit is in contact with the surface of said paper and an inactive position disengaged from contact with said paper surface and said support is engageable with said [first] *writing unit* guide means to move said writing unit to said inactive position when said mangle wheel changes direction of rotation.

3. The mechanism of claim [2] *17*, wherein said [first] *writing unit* guide *means* includes a shaft pivotally supported at [the] opposite ends *thereof* by said side walls.

4. The mechanism of claim [1] *16*, wherein the center of rotation of said mangle wheel is located at a distance from a pivot about which said support is rotatably mounted so that said support is rotated about said pivot when the engagement of said gear with said loop changes from said first toothed portion to said second toothed portion.

5. The mechanism of claim 4, wherein said [first] *writing unit* guide means has an elongated guide frame, and wherein said [rotatable] support [is provided with] *has* a first pulley rotatable in unison with said mangle wheel, and second and third pulleys on said pivot, [and] said elongated frame [is provided with] *having* fourth, fifth and sixth pulleys at one end thereof adjacent said mangle wheel remote from said pivot and a seventh pulley at the opposite end adjacent said pivot remote from said mangle wheel, and [wherein] a length of wire [runs] *running* from said first pulley, second pulley, fourth pulley and seventh pulley [through] *via* said sixth pulley, fifth pulley to said third pulley and finally to said first pulley, said third pulley being coaxially rotatable with said second pulley and said fourth and fifth pulleys being coaxially rotatable.

6. The mechanism of claim 4, wherein said pivot carries a pulley [and], *means being provided for transmitting* said rotational movement of said mangle wheel [is transmitted] via said pulley to said writing unit.

7. The mechanism of claim [1] *16*, wherein the direction of movement of said support is substantially perpendicular to the direction of movement of said writing unit.

8. The mechanism of claim 1, wherein said shifting means comprises first and second rollers rotatably mounted on said side walls in contact with the circumferential periphery of one another, and a ratchet wheel mounted for rotation with said first roller and engageable with a ratchet pawl mounted on said support.

9. The mechanism of claim 7, [wherein] *including* a manual knob [is] coupled to said second roller for rotation therewith, [and] said manual knob [includes] *including* a one-way clutch means to prevent damage occuring [on] *to* said ratchet wheel when rotated in a direction opposite to the direction of movement of said paper.

10. The mechanism of claim 8, wherein [the] *an* intermediate portion of said second roller has a larger diameter than *have portions of the second roller at the opposite ends thereof.*

11. The mechanism of claim 1, wherein said [second] *additional* guide means includes a guide channel, *and* an elongated plate pivotally supported at [the] opposite ends thereof within [the] *a* housing [and arranged to be in] *for* contact *of the plate* with the [plane of said] recording paper.

12. The mechanism of claim [1] *16*, including a pulse generating mechanism which includes a second gear driven by said drive means *and similar to the gear engaged with said loop,* a magnetic core one end of which [being] *is* in proximity to one of the *teeth toothed portions* of *the mangle wheel engaged by* said *second* gear; a coil wound on said magnetic core, a permanent magnet adjacent said coil, and a generally L-shaped member one end of which [being] *is* magnetically coupled to said permanent magnet and the other end of which [being] *is* in proximity to another of said [teeth] *toothed portions of the mangle wheel engaged by said second gear* to thereby form a magnet circuit, whereby a train of pulses are generated from said coil due to variation of magnetic flux in said magnet circuit.

13. The mechanism of claim [1] *16*, including a pair of switch contacts operable when said writing unit is in a predetermined position to de-energize said drive means.

14. The mechanism of claim [10] *13* including a cam rotatable in unison with said mangle wheel and a cam follower resiliently supported [on said bottom wall] to operate said switch contacts.

15. The mechanism of claim 5, wherein said writing unit is carried on a support having a slot extending parallel with the direction of movement of said writing unit and an eccentric cam having its camming surface knurled and received in said slot, [and] an extent of said wire between said sixth and seventh pulleys [is] *being* engaged between the adjacent wall of said slot and the knurled surface of said eccentric cam.

*16. A writing mechanism comprising; a writing unit of a non-impact type; means for moving the writing unit along a straight path to scan across each of a plurality of line paths within a sheet of recording paper; a rotatably mounted support; a mangle wheel rotatably mounted on said support and having first and second toothed portions arranged in an outer and an inner arcuate path to form a continuous loop; a gear engaged with said loop of teeth; drive means for driving said gear whereby said mangle wheel is rotated in one direction at a first speed and in the opposite direction at a second speed higher than said first speed; writing unit guide means for guiding said writing unit along said straight path; and means connecting said writing unit with said mangle wheel to cause said writing unit to move in opposite directions.*

*17. A mechanism for moving a writing unit of a nonimpact type along a straight path to scan across each of a plurality of line paths within a sheet of recording paper, comprising; a housing having a bottom wall and a pair of opposing side walls; a support rotatably mounted on said bottom wall; a mangle wheel rotatably mounted on said support and having first and second toothed portions arranged in an outer and an inner arcuate path to form a continuous loop; a gear engaged with said loop of teeth, drive means for driving said gear whereby said mangle wheel is rotated in one direction at a first speed and in the opposite direction at a second speed higher than said first speed; writing unit guide means for guiding said writing unit along said straight path; and means for connecting said writing unit with said mangle wheel to cause said writing unit to move in opposite directions.*

* * * * *